Figure 1:
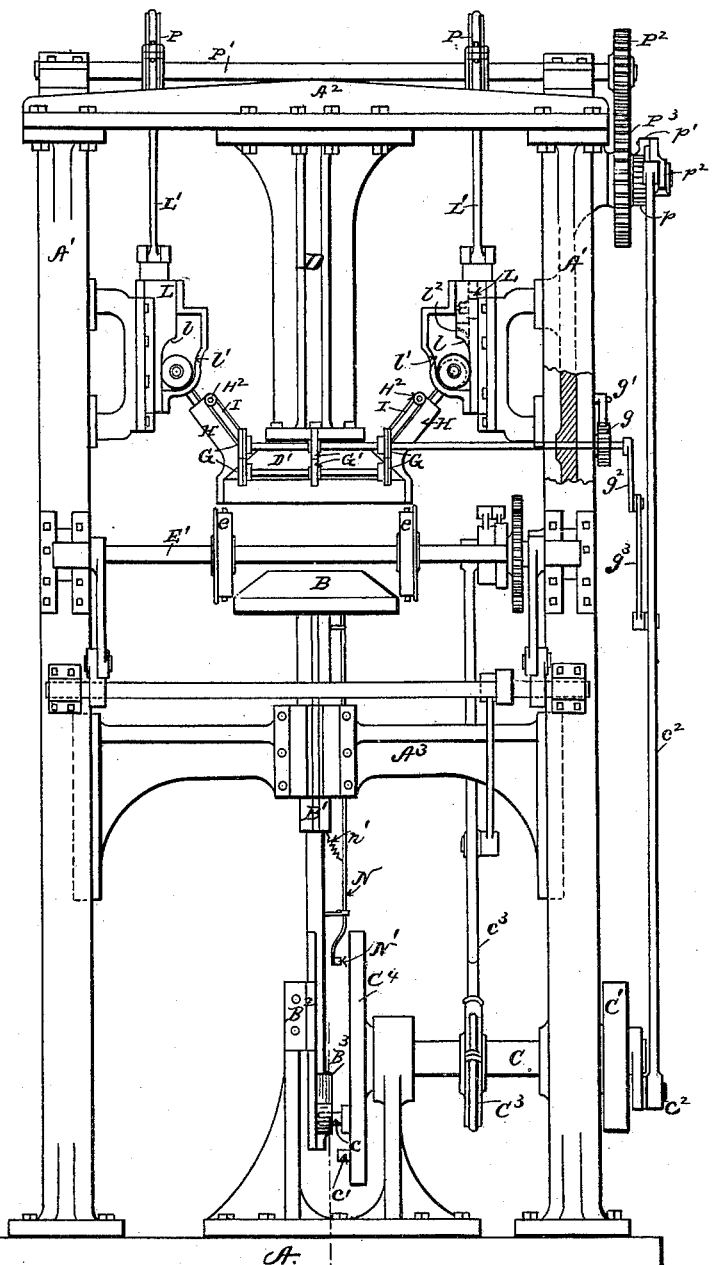

(No Model.) 4 Sheets—Sheet 1.

J. E. TINKER & G. T. BENJAMIN.
FORMING MACHINE FOR MANUFACTURING WOODEN TRAYS.

No. 417,890. Patented Dec. 24, 1889.

Witnesses.
W. R. Edelen
Geo. W. King

Inventors
Julien E. Tinker
George T. Benjamin.
By Leggett & Leggett
Attorneys (No Model.) 4 Sheets—Sheet 2.
J. E. TINKER & G. T. BENJAMIN.
FORMING MACHINE FOR MANUFACTURING WOODEN TRAYS.
No. 417,890. Patented Dec. 24, 1889.
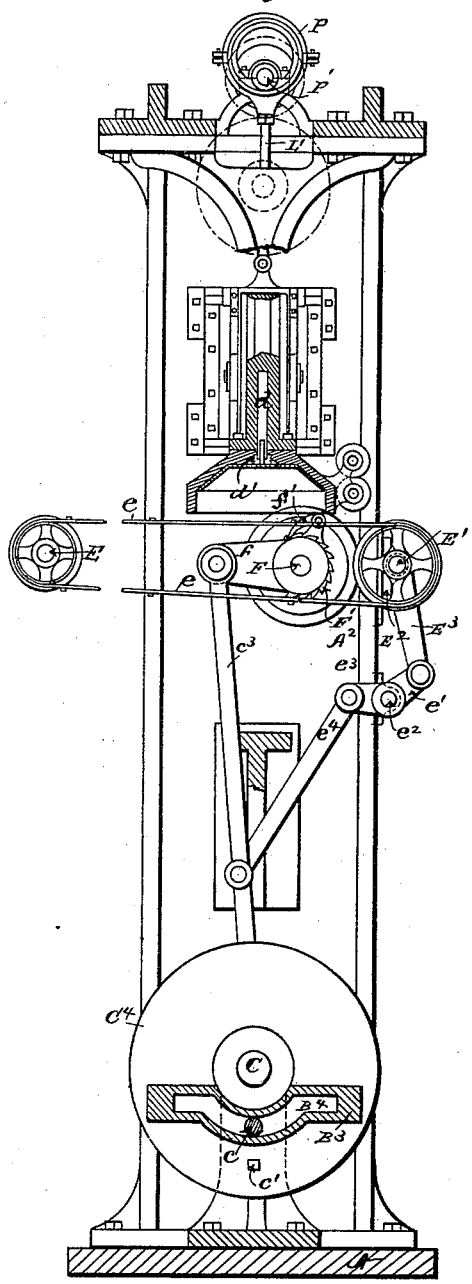
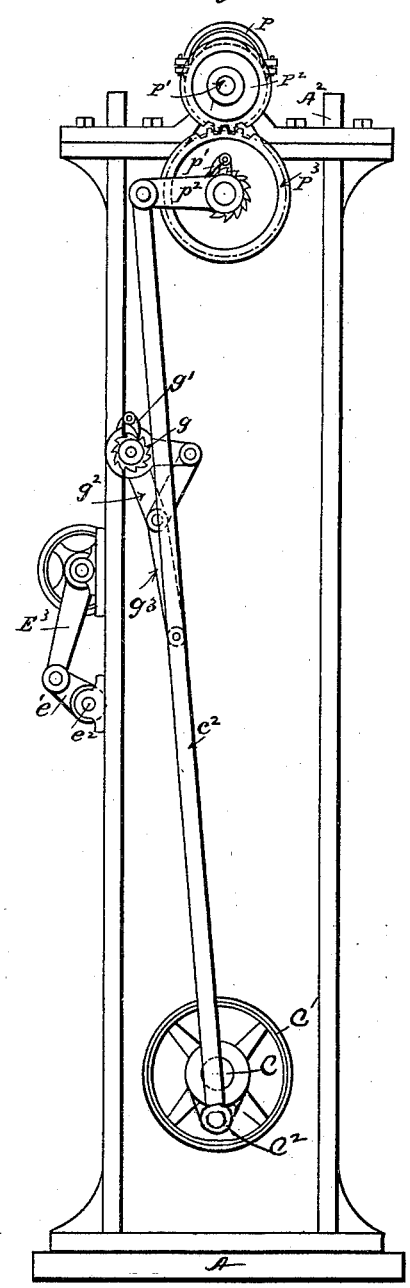
Witnesses
W. R. Edwin.
Geo W. King
Inventors
Julien E. Tinker.
George T. Benjamin.
By Leggett & Leggett
Attorneys (No Model.) 4 Sheets—Sheet 3.
J. E. TINKER & G. T. BENJAMIN.
FORMING MACHINE FOR MANUFACTURING WOODEN TRAYS.
No. 417,890. Patented Dec. 24, 1889.
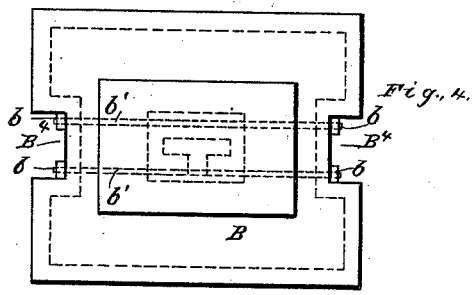
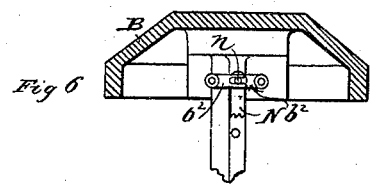
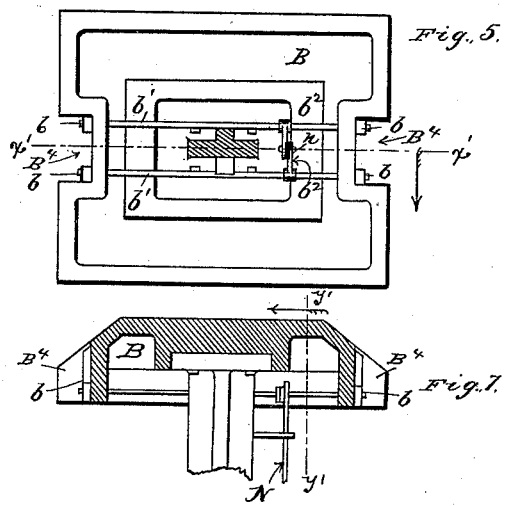
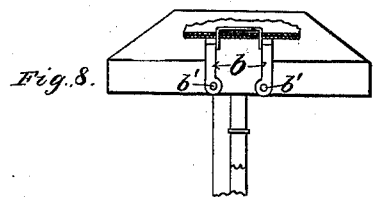
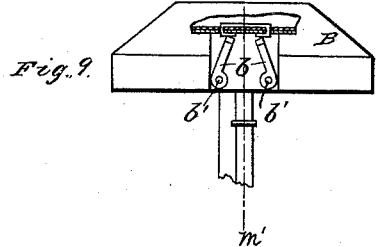
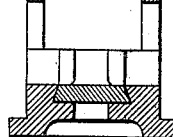
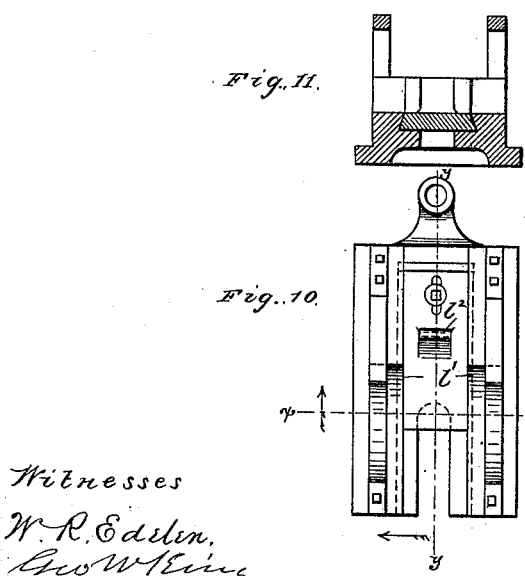
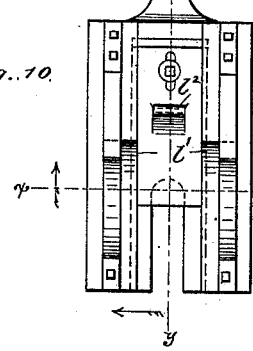
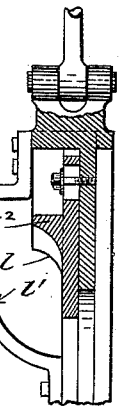
Witnesses
W. R. Edelen,
Geo. W. King
Inventors
Julien E. Tinker
George T. Benjamin
By Leggett & Leggett
Attorneys.
N. PETERS. Photo-Lithographer, Washington, D. C.

(No Model.) 4 Sheets—Sheet 4.
J. E. TINKER & G. T. BENJAMIN.
FORMING MACHINE FOR MANUFACTURING WOODEN TRAYS.
No. 417,890. Patented Dec. 24, 1889.
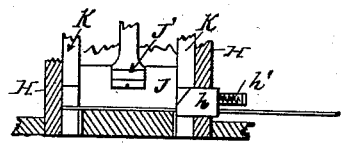
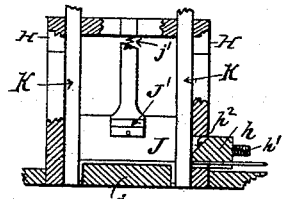
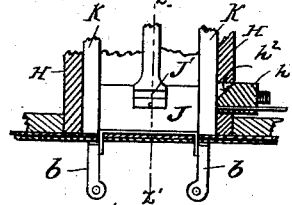
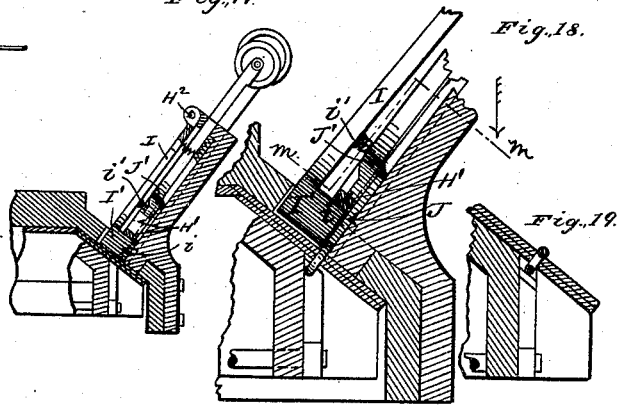
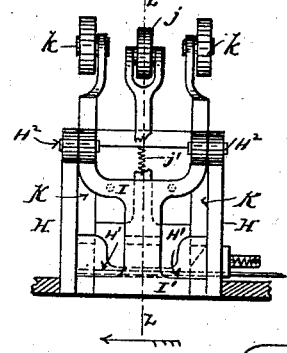
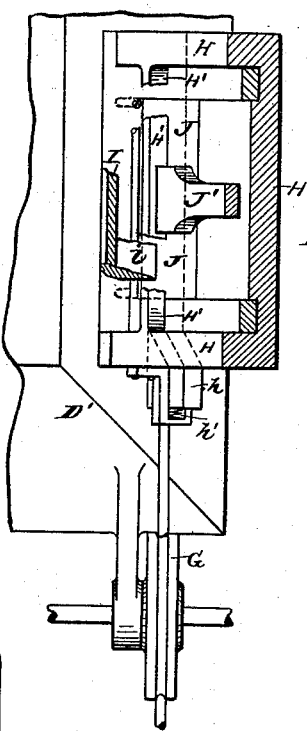
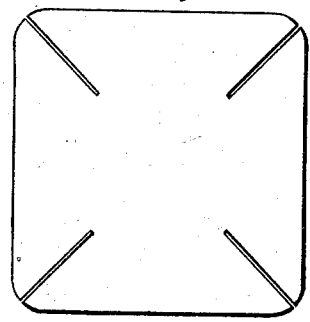
Witnesses.
W. R. Edelin.
Geo. W. King.
Inventors
Julien E. Tinker.
George T. Benjamin.
By Leggett & Leggett
Attorneys.

UNITED STATES PATENT OFFICE.

JULIEN E. TINKER, OF MENTOR, OHIO, AND GEORGE T. BENJAMIN, OF CHATTANOOGA, TENNESSEE.

FORMING-MACHINE FOR MANUFACTURING WOODEN TRAYS.

SPECIFICATION forming part of Letters Patent No. 417,890, dated December 24, 1889.

Application filed May 1, 1889. Serial No. 309,241. (No model.)

*To all whom it may concern:*

Be it known that we, JULIEN E. TINKER, of Mentor, in the county of Lake and State of Ohio, and GEORGE T. BENJAMIN, of Chattanooga, in the county of Hamilton and State of Tennessee, have invented certain new and useful Improvements in Forming-Machines for Manufacturing Wooden Trays; and we do hereby declare the following to be a full, clear, and exact description of the invention, such as will enable others skilled in the art to which it pertains to make and use the same.

Our invention relates to improvements in forming-machines for manufacturing wooden trays; and it consists in certain features of construction and in combination of parts hereinafter described, and pointed out in the claims.

The trays manufactured by this machine are such as are commonly used in the retail trade for butter-dishes and other purposes, and are made from blanks of thin veneer, such blanks being slitted at the ends thereof, the slits being approximately in line with the sides of the bottom member of the tray, so that in shaping the tray in the forming-dies the sections adjacent such slits overlap each other and are secured by staples, the one staple reaching from one lap to the other on the same end of the tray. The blanks and finished trays may be substantially the same as heretofore manufactured on other machines, and of course the form of the blank and the size and shape of the tray may be varied indefinitely.

In the accompanying drawings, Figure 1 is a front elevation. Fig. 2 is an end elevation in section through the center of Fig. 1. Fig. 3 is a right-hand end elevation. Fig. 4 is a plan of the plunger-head. Fig. 5 is a bottom plan of the same. Fig. 6 is an elevation in section on line $y\ y$, Fig. 7. Fig. 7 is an elevation in section on line $x'\ x'$, Fig. 5. Figs. 8 and 9 are end elevations of the plunger-head, showing, respectively, the clinchers open and closed. Fig. 10 is an inside elevation of inclines for operating the staple-forming fingers and driver. Fig. 11 is an elevation in section on line $x\ x$, Fig. 10. Fig. 12 is an elevation in section on line $y\ y$, Fig. 10. Fig. 13 is an elevation, partly in section, showing fingers K and driver J, with wire in position. Figs. 14 and 15 are elevations, partly in section, of the staple-forming mechanism, showing, respectively, the fingers K depressed and with fingers K and driver J all depressed. Fig. 16 is an inside elevation of the staple-forming devices. Fig. 17 is an elevation in section on line $z\ z$, Fig. 16. Fig. 18 is an enlarged elevation in section on line $z'\ z'$, Fig. 15. Fig. 19 is an enlarged elevation in section on line $m'\ m'$, Fig. 9. Fig. 20 is a plan, partly in section, on line $m\ m$, Fig. 18. Fig. 21 is a plan of blank.

A represents the bed-plate, upon which are secured the broad upright side pieces A' A'. The latter at the top are connected by two cross-bars $A^2$, these cross-bars being separated some little distance to admit other members between them. Uprights A' are also connected by cross-bar $A^3$, which latter, together with the cap connected at the lateral center thereof, forms a box through which plunger-rod B' reciprocates, this rod where it engages the box being square, or of such form in cross-section that it will hold the plunger-rod from turning on its axis. The lower section of the rod is embraced by gibs $B^2$, and the rod near the lower end thereof is provided with a block $B^3$, having a cam-groove $B^4$.

C is the driving-shaft, having driving-pulley C' and crank $C^2$ located outside the driving-pulley, and having at the inner end of the shaft disk $C^4$, the latter being provided with wrist $c$ for operating in cam-groove $B^4$ for actuating the plunger. Disk $C^4$ has also a lug $c'$, projecting from the face thereof, that serves as a cam or incline for actuating the clinchers, hereinafter described. Also on the driving-shaft is mounted eccentric $C^3$ for operating the feed mechanism. Crank $C^2$ connects with pitman $c^2$, and the eccentric-strap connects with rod $c^3$.

D is an arm depending from cross-beams $A^2$, this arm having attached to the lower end thereof the female die or former D', such die having on the under side thereof an inverted-disk-shaped concavity adapted to fit outside the finished work, and of course corresponding in form with the face of the co-operating plunger-head B E and E' are co-operating shafts, each shaft having two band-wheels for operating, respectively, the two narrow feed-belts $e\,e$, these belts being near enough to each other to support and feed the blank laid thereon, but are separated sufficiently to admit plunger-head B between the belts. Shaft E is journaled in suitable stationary boxes located, preferably, some distance from the machine to give ample length to the feed-belts. These boxes are not necessarily connected with the machine, but may be attached to any suitable support. Shaft E' is journaled in vertically-sliding boxes $E^2$, connected with and sliding on the respective edges of standards A'. Boxes $E^2$ are connected by links $E^3$ with rock-arms $e'$, the latter being mounted on rock-shaft $e^2$. This shaft has a rock-arm $e^3$ connected by link $e^4$ with the eccentric-rod $c^3$ aforesaid, by which arrangement of parts the feed-belts with the downstroke of plunger B are depressed far enough to allow the finished tray to fall out of die D'. The blanks are laid upon the feed-belts $e$, these belts having suitable stops at regular intervals, against which the blanks are placed, and for intermittently rotating shaft E' to move belt $e$ the distance from one stop to another, by means of which the blanks are successively drawn under and the finished trays moved from under die D', the following mechanism is provided:

Shafts E' and F are intergeared, and on the latter is rigidly mounted a ratchet-wheel F' and loosely mounted an arm $f$, said arm having attached a pawl $f'$ for engaging the ratchet-wheel, the free end of arm $f$ being connected with the eccentric-rod $c^3$ aforesaid. Arm D and die D' are chambered vertically to receive loosely a heavy bar $d$, this bar having a reduced lower section of some length that fits easily in bushing $d'$, by means of which the bar can only descend the length of the reduced section. With the upstroke of plunger-head B the blank is first pressed against the lower end of bar $o$, the further upward movement of the plunger forcing the bar up into its recess until the lower end of the bar is flush with the adjacent surface of the die, the gravity of this bar meantime holding the blank with considerable firmness upon the plunger-head, by means of which the blank is held from displacement on entering the die. With the downstroke of the plunger, bar $d$ by gravity forces the finished tray out of die D'. The wire of which the staples are made that secure the overlapping sections of the tray is placed upon reels, (not shown,) and is drawn in between the two sets of feed-rolls G G. The shafts on which these rollers are mounted may have engaging twin gears G' G', if necessary; but if the grooves that engage the wire are rough or slightly corrugated such intergearing of the shafts will hardly be necessary. On the one end of one of these wire-feed shafts is mounted a ratchet-wheel $g$, engaged by a pawl $g'$. The latter is connected with lever $g^2$, this lever being loose on the shaft. The free end of lever $g^2$ is connected by link $g^3$ with pitman $c^2$ aforesaid, by which arrangement with each stroke of the machine the two wires are each drawn in between the feed-rolls the exact length required for forming the staples.

H are housings connected with the respective end sections of die D', these housings being in the inclined position shown approximately at right angles to the adjacent internal surface of the die. Operating in a lateral opening in each housing is a sliding block $h$, adapted to move toward and from the feed-roll, each block $h$ having a longitudinal hole, through which the wire passes. Blocks $h$ are moved inward by springs $h'$, and are moved outward by fingers K, engaging inclines $h^2$ of these blocks. Cross-bar H' extends internally from side to side of the housings, leaving just room for the wire between the inner face of the cross-bar and the back wall of the housing. The lower section of driver J is broad and thin and fits in between cross-bar H' and the back wall of the housing, such driver being held in place by the cross-bar.

I is a forked arm pivoted at $H^2$ to the edges of the housing, so that the arm can tilt outward and upward, and when left free will return to its depressed position by gravity. The lower end of the arm terminates in a broad head I', having an inwardly-projecting shelf $i$, that, when the arm is in its normal or depressed position, extends under cross-bar H' and abuts or extends close to the back wall of the housing, thus exposing a ledge back of the internal line of the cross-bar, along which ledge the wire travels as it is "fed in" and on which the wire rests while the wire is being cut and bent to form the staple, shelf $i$ serving as a former in shaping the staple. The inner end of blocks $h$ while the wire is being fed rests against the end of shelf $i$, the hole in the block through which the wire enters being in line with but just above the shelf, by means of which the wire, that is small and likely to be bent more or less, is always directed onto the shelf, the wire being confined laterally by cross-bar H' on the one side and by the back wall of the housing on the other side and confined above by driver J.

K K are fingers located next inside the edge of the housing, the lower ends of these fingers in their elevated or normal position being just above the wire. The simultaneous depression of the fingers endwise bends the end of the wire down past the ends of the former or shelf $i$, the one finger in its descent first engaging inclines $h^2$ and thereby snubbing back block $h$ and directly after severing the wire. Just as the ends of the wire are bent down in place by fingers K driver J is depressed. The shank of the driver is provided with an incline J', that engages a lug $i'$ of arm I and tilts the latter sufficiently to move shelf $i$ from under the staple, and the further movement of the driver forces the prongs of the staple through the overlapping sections of the tray. On the reverse movement of the driver and fingers, arm I returns to its place by gravity and block $h$ is returned inward by the action of the spring $h'$. Each finger K is provided at the upper end thereof with a roller $k$ for engaging the inclines that reciprocate these fingers, and driver J is provided with a similar roller $j$, that engages the incline that depresses the driver, the latter being reversed by the action of spring $j'$. It will be understood that there are slots in the sloping end walls of die D', through which the staples are driven. For actuating driver J and fingers K, vertically-reciprocating cross-heads L are provided, each cross-head and near the lateral edges of the same having inclines $l$ and $l'$ for engaging rollers $k$ of the respective fingers, these inclines respectively depressing and elevating the fingers at the proper time; also, at the lateral center of each cross-head is provided an incline $l^2$ for engaging roller $j$ and thereby depressing the driver, incline $l$ being in advance of incline $l^2$ in their action on the rollers. (See Fig. 12.) Driver J is reversed by the action of spring $j'$. Cross-heads L reciprocate in suitable ways connected with the side frames A', as shown, each cross-head being connected by a rod L' and strap with eccentrics P, the latter being mounted on shaft P'. The one end of the shaft is provided with pinion $P^2$, that engages gear $P^3$. The latter has attached a ratchet-wheel $p$, actuated by pawl $p'$ and lever $p^2$, the free end of the lever being connected with pitman $c^2$ aforesaid, by which arrangement cross-heads L are intermittently operated as required with each stroke of the machine.

For clinching the staples after they are driven through the walls of the tray the following mechanism is provided: Plunger-head B has notches $B^4$, into which the ends of the staple protrude and in which are located the clinchers. The clinchers—four in number—consist of fingers $b$, mounted on the respective ends of the parallel shafts $b'$, the latter extending through and being journaled in suitable holes in the body of the plunger-head B. In their normal position the clinchers stand upright against the side walls of notches $B^4$ and the protruding ends of the staples are next inside or between the opposing clinchers. (See Fig. 8.) In clinching the wire the clinchers turn toward each other to the position shown in Fig. 9, thereby bending the wire against the inner surface of the tray. Each shaft $b'$ is provided with a lateral arm $b^2$, these arms extending toward and overlapping each other, such overlapping ends embracing the upper end of rod N. Each arm $b^2$ has a slot $b^3$, and rod N has a rigid pin $n$ extending laterally in either direction and operating in slots $b^3$, by which arrangement the depression of rod N moves the clinchers toward each other. Rod N is held in its normal or elevated position by the tension of spring $n'$, in which position of parts the clinchers are opened, as shown in Fig. 8. Rod N reciprocates through suitable guides connected with plunger-rod B', to which latter is also attached the one end of spring $n'$, so that rod N moves up and down with the plunger-rod. Rod N at the lower end thereof has a toe N' extending toward disk $C^4$ aforesaid. Once in a revolution of disk $C^4$ lug $c'$ thereof engages toe N' and depresses rod N, thereby moving the clinchers toward each other for clinching the staples.

The different parts of the machine are timed to co-operate with each other to produce the general result.

The movement of the machine is quite rapid, the work being done about as fast as an operator can place the blanks upon the feed-belts, such placing of the blanks being the only manual labor required in operating the machine.

What we claim is—

1. The combination, with clinchers mounted on parallel shafts journaled in the plunger-head, such shafts having slotted arms extending toward and overlapping each other, substantially as indicated, of the rod embraced by such overlapping arms, the rod having a lateral pin operating in the slots of the arms, a spring for elevating the rod, a toe connected with the rod, and a lug connected with the disk on the driving-shaft for engaging such toe, whereby the clinchers are operated against the action of the said spring, substantially as set forth.

2. The combination, with housing provided with cross-bar separated from the back wall of the housing, of driver operating between such cross-bar and back wall, a tilting gravity-arm having a shelf adapted to extend under such cross-bar, and a lug and incline connected, respectively, with the tilting-arm and driver for tilting the former with the depression of the latter, substantially as set forth.

3. The combination, with feed-belts, band-wheels, and shafts for supporting such belts, of sliding boxes for supporting the one shaft, and mechanism for operating such sliding boxes to elevate and depress the feed-belt, substantially as set forth.

4. In a machine for making wooden trays, the combination, with cross-heads L, shaft P', and eccentrics mounted on the shaft for operating the cross-head, substantially as indicated, of crank on the driving-shaft, a pitman connecting with such crank, lever, pawl, ratchet-wheel, and gear, substantially as indicated, for operating shaft P' from the crank of the driving-shaft, substantially as set forth.

5. The combination, with feed-rolls for wire and mechanism for forming such wire into staples, substantially as indicated, of a sliding block having a longitudinal hole for the passage of the wire, a spring for moving the sliding block inward, an incline for moving the block outward, and mechanism for cutting the wire, the parts being arranged substantially as described, and for the purpose set forth.

In testimony whereof we sign this specification, in the presence of two witnesses, respectively, this 17th and 22d day of November, 1888.

JULIEN E. TINKER.
GEORGE T. BENJAMIN.

Witnesses to signature of J. E. Tinker:
CHAS. H. DORER,
ALBERT E. LYNCH.

Witnesses to signature of G. T. Benjamin:
C. E. KING,
W. B. GARVIN.